(12) United States Patent
Lu et al.

(10) Patent No.: US 7,597,717 B1
(45) Date of Patent: Oct. 6, 2009

(54) ROTATABLE MULTI-CANTILEVER SCANNING PROBE MICROSCOPY HEAD

(75) Inventors: Ryan P. Lu, Carlsbad, CA (US);
Stephen D. Russell, San Diego, CA (US); Ayax D. Ramirez, Chula Vista, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 248 days.

(21) Appl. No.: 11/767,713

(22) Filed: Jun. 25, 2007

(51) Int. Cl.
*G01N 13/10* (2006.01)
*G01N 13/12* (2006.01)
*G01N 13/14* (2006.01)
*G01N 13/16* (2006.01)
*G01N 13/22* (2006.01)

(52) U.S. Cl. .............. 850/22; 850/21; 850/23; 850/24; 850/25; 977/849; 977/860; 977/874

(58) Field of Classification Search .......... 250/306, 250/307, 309, 310, 311, 312; 850/21, 22, 850/23, 24, 25, 55, 29, 32, 40, 41, 45, 48, 850/49; 977/849, 860, 874
See application file for complete search history.

(56) References Cited

U.S. PATENT DOCUMENTS

| | | | | |
|---|---|---|---|---|
| 5,289,004 A * | 2/1994 | Okada et al. ............... 850/1 |
| 5,444,191 A * | 8/1995 | Yamamoto et al. ........... 850/55 |
| 5,756,997 A * | 5/1998 | Kley ........................... 850/1 |
| 6,028,305 A * | 2/2000 | Minne et al. ................ 850/57 |
| 6,465,782 B1 * | 10/2002 | Kendall ...................... 850/55 |
| 6,469,293 B1 * | 10/2002 | Shimizu et al. ............. 850/55 |
| 6,583,411 B1 * | 6/2003 | Altmann et al. ............. 850/55 |
| 6,867,443 B2 * | 3/2005 | Liu et al. .................... 850/61 |
| 7,340,944 B2 * | 3/2008 | Beyder et al. ............... 73/105 |
| 2005/0099895 A1 * | 5/2005 | Maeda et al. ............. 369/13.01 |

* cited by examiner

*Primary Examiner*—Jack I Berman
*Assistant Examiner*—Brooke Purinton
(74) *Attorney, Agent, or Firm*—Ryan J. Friedl; Kyle Eppele

(57) ABSTRACT

A scanning probe microscopy head may include a base portion, cantilevers coupled to the base portion, and at least one tip coupled to each of the cantilevers. At least two of the cantilevers and associated tips may be configured to perform a different scanning probe microscopy technique. The cantilevers may be positioned perpendicular to the base portion and may be coupled to the perimeter of the base portion. The base portion may include circuitry coupled thereto for providing electricity to the tips. The cantilevers may each be placed into a recessed slot along the perimeter of the base and secured to the base by a securing mechanism, such as a spring clip. The cantilevers may be operatively coupled to a linear positioner, such as a piezoelectric motor, coupled to the perimeter of the base for controlling the amount of protrusion of the cantilevers from the perimeter of the base.

14 Claims, 3 Drawing Sheets

ROTATABLE MULTI-CANTILEVER SCANNING PROBE MICROSCOPY HEAD

FEDERALLY-SPONSORED RESEARCH AND DEVELOPMENT

The Rotatable Multi-Cantilever Scanning Probe Microscopy Head was developed with Federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3001, facsimile (619) 553-3821. Reference Navy Case No. 98765.

BACKGROUND OF THE INVENTION

The present invention is generally related to the field of scanning probe microscopy. As feature sizes shrink to less than 50 nm, Scanning Probe Microscopy (SPM) techniques are required to provide fast, cost-effective physical and electrical characterization with sub-nanometer precision.

Currently, SPM devices utilize a single cantilever which may contain one or more tips. The tip is scanned over the area of interest and generates a computer image providing structural, electrical, or optical information. As the tip wears out or breaks, the user must replace the tip manually by hand. The replacement process is generally accomplished by first removing the SPM head and then removing the cantilever which is held in place with a clip. This replacement process must be repeated each time a user wishes to perform a different type of SPM characterization. As many different types of SPM techniques exist, including: atomic force microscopy (AFM), scanning capacitance microscopy (SCM), scanning ion-conductance microscope (SICM), scanning spreading resistance microscopy (SSRM), spreading resistance profiling (SRP), second ion mass spectrometry (SIMS), scanning tunneling microscope (STM), scanning thermal microscopy (SthM), scanning voltage microscopy (SVM), magnetic force microscopy (MFM), electrostatic force microscopy (EFM), Kelvin probe force microscopy (KPFM), and dip pen nanolithography (DPN), a user desiring to perform multiple SPM characterizations on a given surface must manually perform many tip replacements.

Therefore, there is a current need for a SPM device that allows for quick, simple and cost-effective switching between various SPM characterization methods and does not require extensive manual user interaction.

DETAILED DESCRIPTION OF SOME EMBODIMENTS

Figure 1:
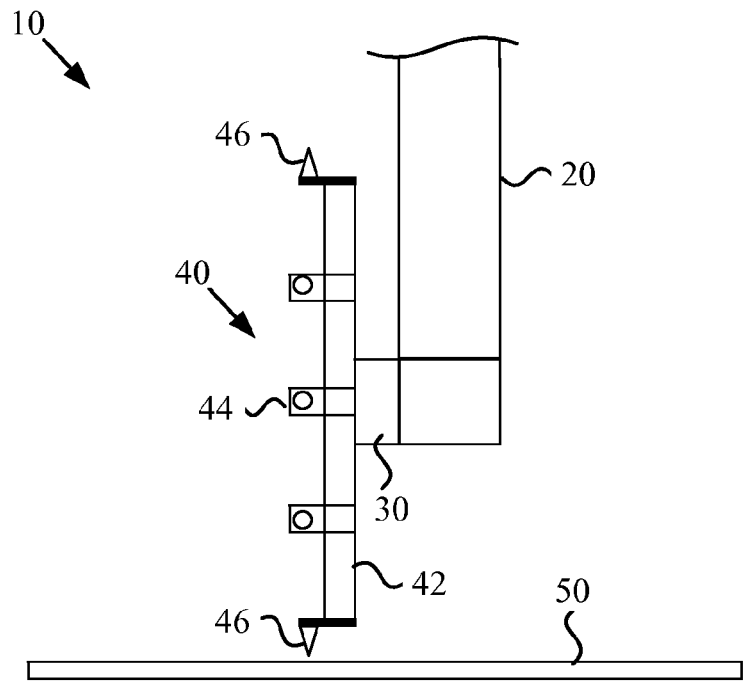
FIG. 1 shows a side perspective view of a portion of a scanning probe microscopy device having an embodiment of the rotatable multi-cantilever scanning probe microscopy head attached thereto.

FIG. 1 shows a side perspective view of a portion of a scanning probe microscopy device 10 having an embodiment of the rotatable multi-cantilever scanning probe microscopy head 40 attached thereto. Device 10 may include a support 20, a connector 30 coupled to support 20, and a head 40 coupled to connector 30. Support 20 may be attached in various ways to the body portion (not shown) of device 10. In some embodiments, connector 30 may be coupled perpendicularly to support 20. In some embodiments, connector 30 may be linearly coupled to support 20 such that support 20 and connector 30 share a common axis. In some embodiments, connector 30 may be rotatably coupled to support 20 such that head 40 may be able to rotate 360 degrees with respect to support 20.

Figure 2:
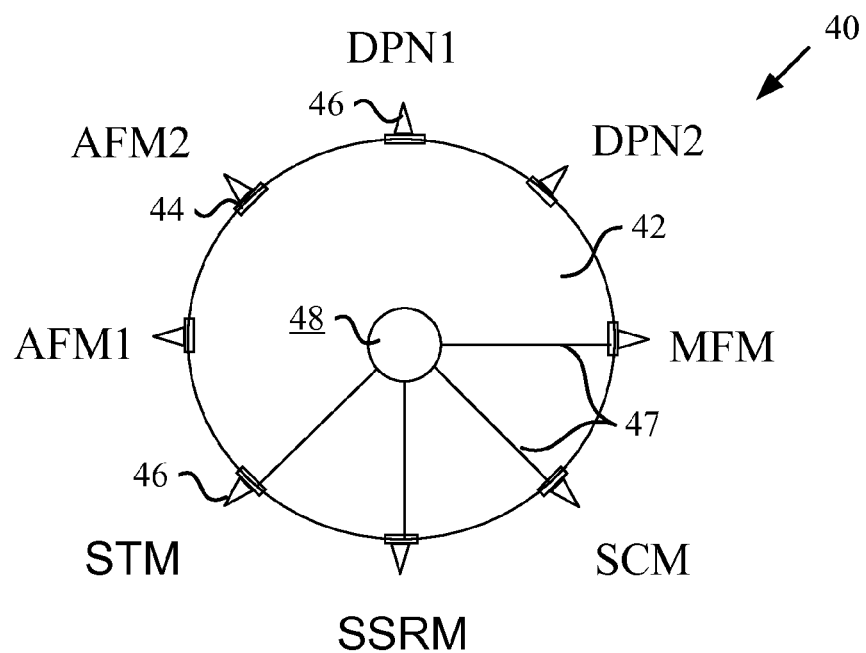
FIG. 2 shows a top view of an embodiment of the rotatable multi-cantilever scanning probe microscopy head.

Referring to FIGS. 1 and 2, wherein FIG. 2 shows a top view of head 40 detached from device 10, head 40 may include a base 42, a cantilever 44 coupled to base 42, and a tip 46 coupled to each of cantilevers 44. Base 42 may comprise various shapes and sizes as recognized by one having ordinary skill in the art. For example, base 42 may be circular in shape and have a diameter of about 1 inch. Base 42 may be comprised of various materials, including aluminum, stainless steel, brass or other conductively-plated materials, such as gold-plated. In some embodiments, base 42 may contain multiple cantilevers 44 or a plurality of cantilevers 44 coupled thereto. An example of a base 42 that may be used in accordance with head 40 may be obtained from the Veeco Metrology Inc., model number Dimension SPM. As shown in FIG. 1, head 40 may be fixed at an angle such that base 42 is perpendicular to a sample surface 50 and parallel with respect to support 20. In some embodiments, head 40 may be oriented at different angles with respect to sample surface 50 (for example, see FIG. 3).

Cantilevers 44 may comprise various shapes and sizes as recognized by one having ordinary skill in the art. For example, cantilevers 44 may be rectangular in shape with a length of about 200 microns and a width of about 40 microns. Cantilevers 44 may be comprised of various flexible materials, including silicon, polycrystalline silicon, and the like, to allow for tips 46 to follow the profile of sample surface 50. In some embodiments, cantilevers 44 may contain multiple tips 46 or a plurality of tips 46 coupled thereto. In such embodiments, tips 46 may be aligned in various orientations on cantilever 44. For example, multiple tips 46 may be linearly positioned adjacent to one another along the length of cantilever 44. An example of a cantilever 44 that may be used in accordance with head 40 may be obtained from Nanosensors, model number PPP-CONT.

In some embodiments, cantilevers 44 may be positioned around the perimeter of base 42. In embodiments where cantilevers 44 have equal widths, w, the maximum number, m, of cantilevers 44 that may be positioned around base 42 may be determined by:

$$m = 3.14 \times \frac{d}{w}, \quad (\text{Eq. 1})$$

where d is the diameter of base 42. Cantilevers 44 may protrude from the edge of the perimeter of base 42 for optical feedback control. Once some or all of the cantilevers 44 are coupled to base 42, an automated tip calibration procedure may be performed to record the positions of tips 46. Tip positioning techniques may be based on optical interferometry, tunneling, and capacitive methods. The record for a position of a particular tip 46 may be retrieved from computer memory, either contained within device 10 or electronically connected to device 10, when an operator selects that particular tip 46 for use. The recording of the positions of tips 46 may allow the newly selected cantilever 44 and associated tip 46 to continue scanning exactly where the previous cantilever 44 left off.

Tips 46 may comprise various shapes and sizes as recognized by one having ordinary skill in the art. For example, tips 46 may be pyramidal or conical in shape and may have a radius of curvature of between 3 nm-50 nm. Tips 46 may be comprised of various materials, including silicon and carbon. An example of a tip 46 that may be used in accordance with head 40 may be obtained from the Nanotools Corporation. Tips 46 may be located at various positions on cantilever 44. In some embodiments, tips 46 may be positioned at one end of cantilevers 44 (see FIG. 4). In some embodiments having multiple tips 46, tips 46 may be positioned at various locations along cantilevers 44. For example, tips 46 may be positioned at one end of cantilevers 44 or linearly along the length of cantilevers 44. In some embodiments, tips 46 may require electricity to perform a particular SPM technique. In these embodiments, head 40 may contain electrical wiring 47 extending along or within base 42. Wiring 47 may comprise one or more conductive layers, traces or wires as recognized in the art. Wiring 47 may be routed through hole 48 to allow for electrical connections from cantilevers 44 to the analog-to-digital converters, feedback circuits, and digital signal processors (not shown) contained within device 10. Wiring 47 may also enable head 40 to perform various SPM techniques, as well as to switch between various SPM techniques. Hole 48 may also serve as a connection point for the attachment of head 40 to connector 30.

Head 40 may contain cantilevers 44 and tips 46 configured for many SPM techniques, including but not limited to: AFM, SCM, SICM, SSRM, SRP, SIMS, STM, SthM, SVM, MFM, EFM, KPFM, and DPN. These techniques allow for imaging of clusters or individual atoms and molecules on a scale ranging from microns to nanometers. Cantilevers 44 and/or each associated tip 46 may be configured to achieve these, and other, SPM techniques according to methods recognized by those having ordinary skill in the art. For example, cantilevers 44 may vary in size, shape, and hardness of material used, depending on the SPM technique to be performed. Similarly, tips 46 may be coated with a particular material suitable for a specific SPM technique. Head 40 is not limited to one cantilever 44 and tip 46 for each particular SPM technique, but may contain more than one cantilevers 44 and/or tips 46 for each particular technique.

Figure 3:
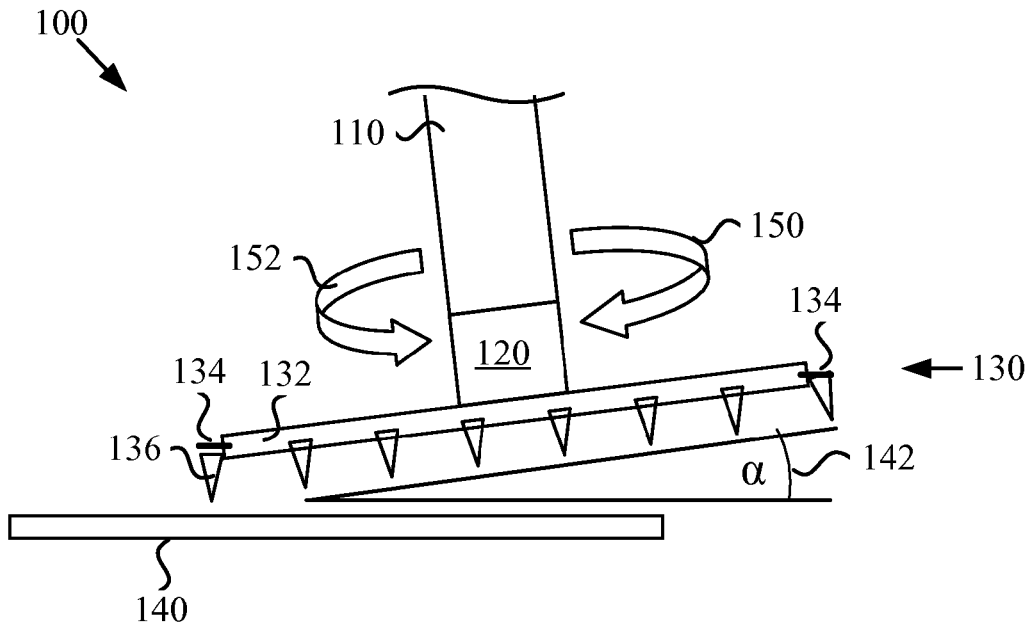
FIG. 3 shows a side perspective view of a portion of a scanning probe microscopy device having an embodiment of the rotatable multi-cantilever scanning probe microscopy head attached thereto.
Figure 4:
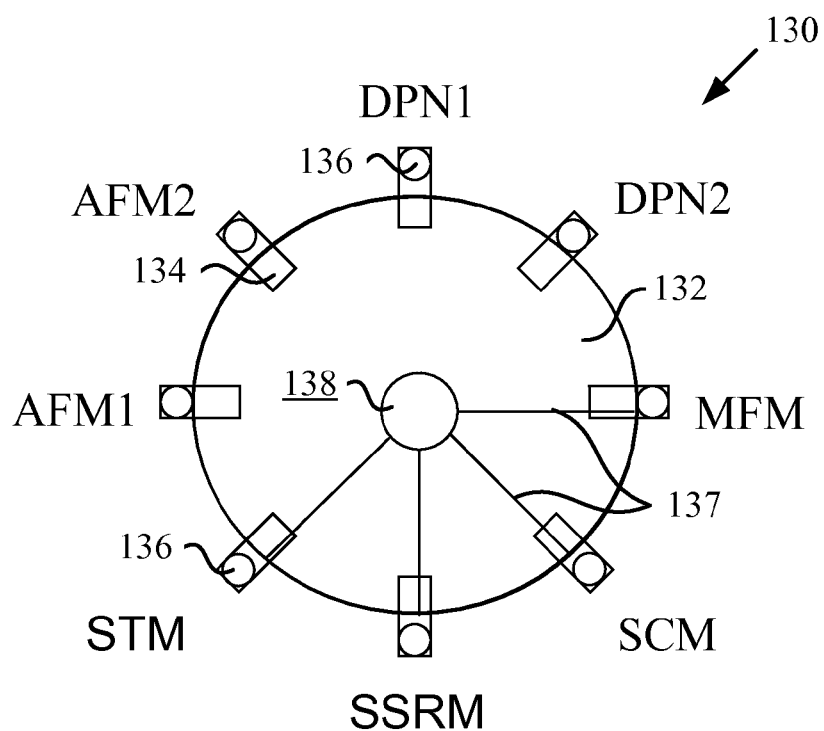
FIG. 4 shows a top view of an embodiment of the rotatable multi-cantilever scanning probe microscopy head.

Referring to FIGS. 3 and 4, FIG. 3 shows a side perspective view of a portion of a scanning probe microscopy device 100 having an embodiment of the rotatable multi-cantilever scanning probe microscopy head 130 attached thereto. FIG. 4 shows a top view of an embodiment of the rotatable multi-cantilever scanning probe microscopy head 130. Device 100 may include a support 110, a connector 120 coupled to support 110, and a head 130 coupled to connector 120. Support 110 may be identical to support 20. Head 130 may be identical to head 40. Connector 120 may be configured to allow for a linear connection of connector 30 with respect to support 120. Head 130 may be coupled to connector 120 such that base 132 is perpendicular with respect to support 110. In this configuration, head 130 may be positioned at an angle 142, represented by $\alpha$, with respect to a sample surface 140. As an example, angle 142 may range from between 0-90 degrees. In some embodiments, angle 142 may vary depending on the shape and size of tips 136, such that only one tip 136 contacts sample surface 140 at a time. In some embodiments, angle 142 may be varied by a computer controlled motor (not shown) connected to or contained within device 100.

In some embodiments, tips 136 may require electricity to perform a particular SPM technique. In these embodiments, head 130 may contain electrical wiring 137 extending along or within base 132. Wiring 137 may comprise one or more conductive layers, traces or wires as recognized in the art. Wiring 137 may be routed through hole 138 to allow for electrical connections from cantilevers 134 to the analog-to-digital converters, feedback circuits, and digital signal processors (not shown) contained within device 100. Wiring 137 may also enable head 130 to perform various SPM techniques, as well as to switch between various SPM techniques. Hole 138 may also serve as a connection point for the attachment of head 130 to connector 120.

Figure 5:
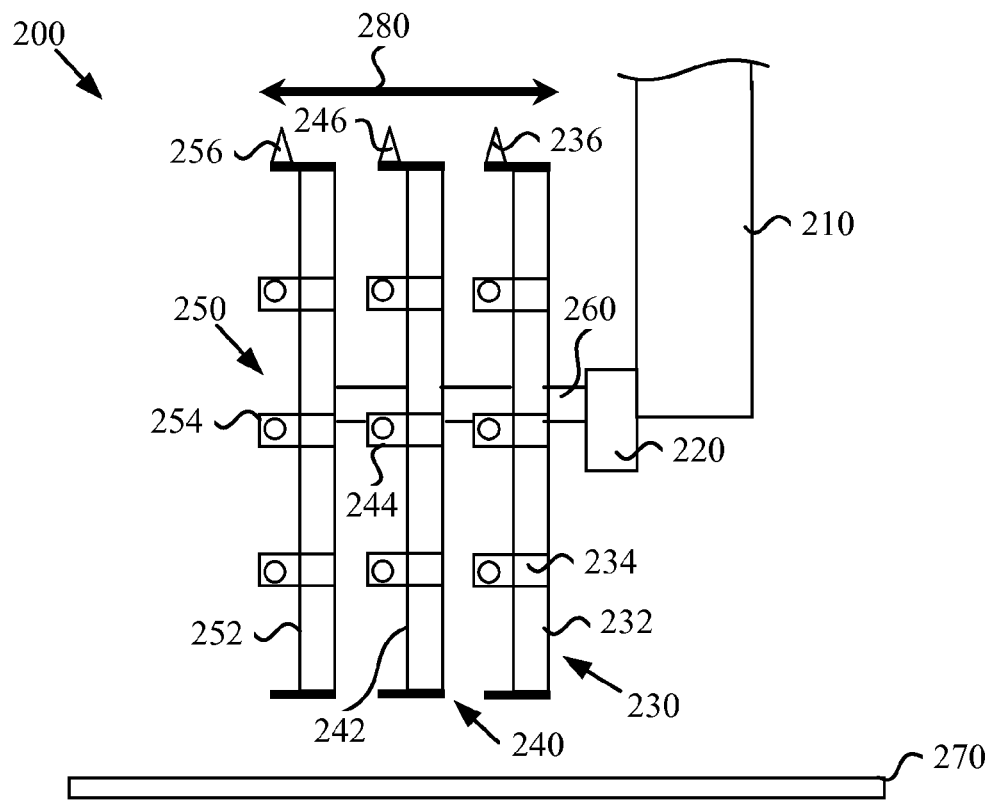
FIG. 5 shows a side perspective view of a portion of a scanning probe microscopy device having multiple copies of an embodiment of the rotatable multi-cantilever scanning probe microscopy head attached thereto.

FIG. 5 shows a side perspective view of a portion of a scanning probe microscopy device 200 having an embodiment of the rotatable multi-cantilever scanning probe microscopy head attached thereto. Device 200 may contain more than one head. As an example, device 200 includes heads 230, 240, and 250. In other embodiments, device 200 may contain a plurality of heads. Heads 230, 240, and 250 may contain similar structure. For example, head 230 may contain a base 232, more than one cantilevers 234, and a tip 236 coupled to each of the cantilevers 234, head 240 may contain a base 242, more than one cantilevers 244, and a tip 246 coupled to each of the cantilevers 244, and head 250 may contain a base 252, more than one cantilevers 254, and a tip 256 coupled to each of the cantilevers 254. Heads 230, 240, and 250 may be coupled to a rod 260 that may be coupled to a connecting member 220. Connecting member 220 may be perpendicularly coupled to a support 210. Support 210 may be coupled to a body portion (not shown) of device 200. In some embodiments, heads 230, 240, and 250 may be able to translate along rod 260 as shown by arrow 280.

In some embodiments, cantilevers 234, 244, and 254 may be positioned around the perimeter of bases 232, 242, and 252 respectively. In embodiments where cantilevers 234, 244, and 254 have equal widths, w, the maximum number, m, of cantilevers 234, 244, and 254 that may be contained within device 200 may be determined by:

$$m = 3.14 \times \frac{nd}{w}, \quad \text{(Eq. 2)}$$

where d is the diameter of the respective base and n is the number of heads, such as heads 230, 240, and 250. Cantilevers 232, 242, and 252 may protrude from the edge of the perimeter of bases 232, 242, and 252 respectively, for optical feedback control.

Once some or all of the cantilevers 234, 244, and 254 are coupled to base 232, 242, and 252 respectively, an automated tip calibration procedure may be performed to record the positions of tips 236, 246, and 256. Tip positioning techniques may be based on optical interferometry, tunneling, and capacitive methods. The record for a position of a particular tip may be retrieved from computer memory, either contained within device 200 or electronically connected to device 200, when an operator selects that particular tip for use. The recording of the positions of tips 236, 246, and 256 allows the newly selected cantilever 234, 244, and 254 and associated tips 236, 246, and 256 to continue scanning where the previous cantilever 234, 244, and 254 left off.

In some embodiments, tips 236, 246, and/or 256 may require electricity to perform a particular SPM technique. In these embodiments, heads 230, 240, and/or 250 may contain electrical layers, traces or wiring (not shown) extending along or within bases 232, 242, and 252. The electrical layers, traces or wiring may allow for electrical connections from cantilevers 234, 244, and 254 to the analog-to-digital converters, feedback circuits, and digital signal processors (not shown) contained within device 200. The wiring may also enable heads 230, 240, and/or 250 to perform various SPM techniques, as well as to switch between various SPM techniques.

Heads 230, 240, and 250 may be configured for many SPM techniques, including but not limited to: AFM, SCM, SICM, SSRM, SRP, SIMS, STM, SthM, SVM, MFM, EFM, KPFM, and DPN. For example, cantilevers 234, 244, and 254 may vary in size, shape, and hardness of material used, depending on the SPM technique to be performed. Similarly, tips 236, 246, and 256 may be coated with a particular material suitable for a specific SPM technique.

Figure 6:
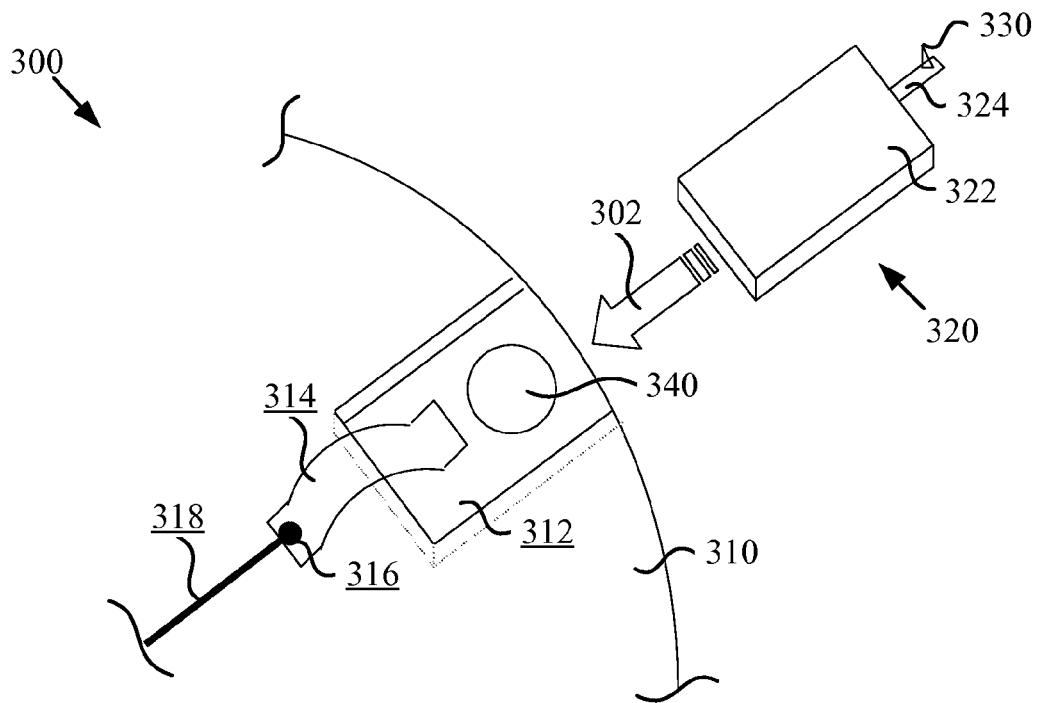
FIG. 6 shows a top view of a portion of an embodiment of the rotatable multi-cantilever scanning probe microscopy head, illustrating the attachment of a cantilever to the base.

FIG. 6 shows a top view of a portion of an embodiment of the rotatable multi-cantilever scanning probe microscopy head 300. Head 300 may be used in conjunction with scanning probe microscopy devices including, but not limited to, devices 10, 100, and 200. Head 300 may have a base 310, more than one cantilevers 320, and a tip 330 coupled to each of the cantilevers 320. Cantilevers 320 may have a substrate portion 322 and a tip attachment portion 324. As an example, substrate portion 322 may be rectangular in shape and comprised of a conductive material. As an example, tip attachment portion 324 may be rectangular in shape and may be at least partially comprised of silicon. Tips 330 may be coupled to tip attachment portion 324 by various means as recognized in the art.

Each cantilever 320 may be placed into a recessed slot 312 located along the perimeter of base 310, as shown by arrow 302. Base 310 may include more than one slots 312 radially disposed along its perimeter. In some embodiments, a portion of cantilevers 320 is disposed within slot 312. For example, only substrate portion 322 may be disposed within slot 312 while tip attachment portion 324 is not disposed within slot 312. In other embodiments, the entire cantilever 320 may be disposed within slot 312, with substrate portion 322 and/or tip attachment portion 324 configured to extend from slot 312 for use and retract into slot 312 during non-use. Cantilevers 320 may be held in place within slot 312 by a securing mechanism 314. As an example, securing mechanism 314 may be a spring clip or a conductive epoxy adhesive. Securing mechanism 314 may have an electrical contact 316 for connection to electrical wiring 318. Electrical wiring 318 may be connected to computer electronics (not shown) contained within or operatively coupled to a scanning probe microscopy device (not shown).

Cantilevers 320 may protrude from the edge of the perimeter of base 310 for optical feedback control. In some embodiments, cantilevers 320 may be in contact with a linear positioner 340 that may be used to control the amount of protrusion of cantilevers 320 from the perimeter of base 310. As an example, linear positioner 340 may be an ultrasonic piezoelectric motor or piezoelectric linear actuator. Linear positioner 340 may be able to control the movement of cantilevers 320 to within 0.1 nanometers with about a 5 millimeter travel distance. An example of an ultrasonic piezoelectric motor that may be configured for this application is Physik Instrumente, model number N-110. In embodiments utilizing cantilevers 320 having a substrate portion 322 and a tip attachment portion 324, linear positioner 340 may cause tip attachment portion 324 to extend from or retract within substrate portion 322. Linear positioner 340 may be coupled to or contained within base 310. In some embodiments, linear positioner 340 may be disposed within slot 312.

In some embodiments, each slot 312 may be assigned an incremental channel number for computerized selection. For example, if an operator of device 300 wishes to use the cantilever 320 located in a particular slot 312, the operator may select the corresponding channel on a computer graphical user interface (not shown) connected to device 300, via keyboard, mouse, or other input device. The selection of the particular channel may activate a motor (not shown) that may control the rotation of base 310 such that a particular cantilever 320 rotates into position over sample surface (not shown). In these embodiments, the horizontal position of base 310 may also be computer controlled, similar to the positioning of base 132 as shown by arrows 150 and 152 in FIG. 3, so that any of cantilevers 320 may be positioned onto or adjacent to the sample surface. In other embodiments, the positioning of head 300 may be manually controlled or electrically controlled. Means for positioning base 310 may include piezoelectric positioners with an optical encoder (not shown), and other positioners as would be recognized by one with ordinary skill in the art. Further, the location of tips 330 may be controlled by a user sending an electrical signal to linear positioner 340, which may control the movement of cantilevers 320 to adjust the amount of protrusion of cantilevers 320 from the perimeter of base 310.

The embodiments of the invention allow for quick, simple and cost-effective switching between various SPM characterization methods. The embodiments of the invention are particularly useful for SPM methods such as DPN, which frequently requires the use of new tips in order to avoid cross contamination of 'inkwells'. The ability to perform writing of nanostructures, obtain surface topographical information, and perform electrical characterization in a single step minimizes the potential for user error.

The scope of the claims is not limited to the embodiments disclosed herein, but extends to other embodiments as may be contemplated by those with ordinary skill in the art.

We claim:
1. A scanning probe microscopy head comprising:
   a circular base portion;
   more than one cantilevers coupled to the perimeter of the base portion, the cantilevers positioned perpendicular to the base portion, the cantilevers comprising a substrate portion and a tip attachment portion, the tip attachment portion configured to linearly extend from and linearly retract within the substrate portion; and
   at least one tip coupled to each of the tip attachment portions, wherein at least two of the cantilevers and associated tips are configured to perform a different scanning probe microscopy technique.

2. The scanning probe microscopy head of claim 1, wherein the base portion includes electrical wiring coupled thereto for providing signal transmission to and from at least one of the cantilevers.

3. The scanning probe microscopy head of claim 1, wherein the cantilevers are each disposed within a recessed slot along the perimeter of the base portion.

4. The scanning probe microscopy head of claim 3, wherein the cantilevers are further secured to the base portion by a spring clip.

5. The scanning probe microscopy head of claim 1, wherein the linear extension and linear retraction of the tip attachment portion is controlled by a linear positioner coupled to the base portion.

6. The scanning probe microscopy head of claim 1, wherein each of the cantilevers and associated tips are configured to perform a different scanning probe microscopy technique.

7. A scanning probe microscopy device comprising:
a support;
a connecting member rotatably coupled to one end of the support; and
at least one rotary head rotatable coupled to the connecting member, the rotary head comprising:
a circular base portion;
more than one cantilevers positioned perpendicular to the base portion, each of the cantilevers disposed within a recessed slot along the perimeter of the base portion and secured to the base portion by a securing mechanism; and
at least one tip coupled to each of the cantilevers, wherein at least two of the cantilevers and associated tips are configured to perform a different scanning probe microscopy technique.

8. The scanning probe microscopy device of claim 7, wherein the connecting member is coupled perpendicularly to the support.

9. The scanning probe microscopy head of claim 7, wherein the connecting member is rotatably coupled to the support such the rotary head rotates 360 degrees with respect to support.

10. The scanning probe microscopy device of claim 7 further comprising a piezoelectric positioner with an optical encoder for angularly positioning the base portion with respect to a sample surface.

11. The scanning probe microscopy device of claim 10, wherein the angular positioning of the base portion is computer controlled.

12. A scanning probe microscopy device comprising:
a support;
a connecting member rotatably coupled to one end of the support; and
at least one rotary head rotatably coupled to the connecting member such that the rotary head rotates 360 degrees with respect to the connecting member, the rotary head comprising:
a circular base portion;
more than one cantilevers coupled to the perimeter of the base portion, the cantilevers positioned perpendicular to the base portion;
at least one tip coupled to each of the cantilevers, wherein at least two of the cantilevers and associated tips are configured to perform a different scanning probe microscopy technique; and
a piezoelectric linear positioner radially aligned along the base for controlling the amount of linear protrusion of the cantilevers from the perimeter of the base portion.

13. The scanning probe microscopy device of claim 12, wherein the connecting member is coupled perpendicularly to the support.

14. The scanning probe microscopy head of claim 12, wherein the connecting member is rotatably coupled to the support such the rotary head rotates 360 degrees with respect to the support.

* * * * *